UNITED STATES PATENT OFFICE.

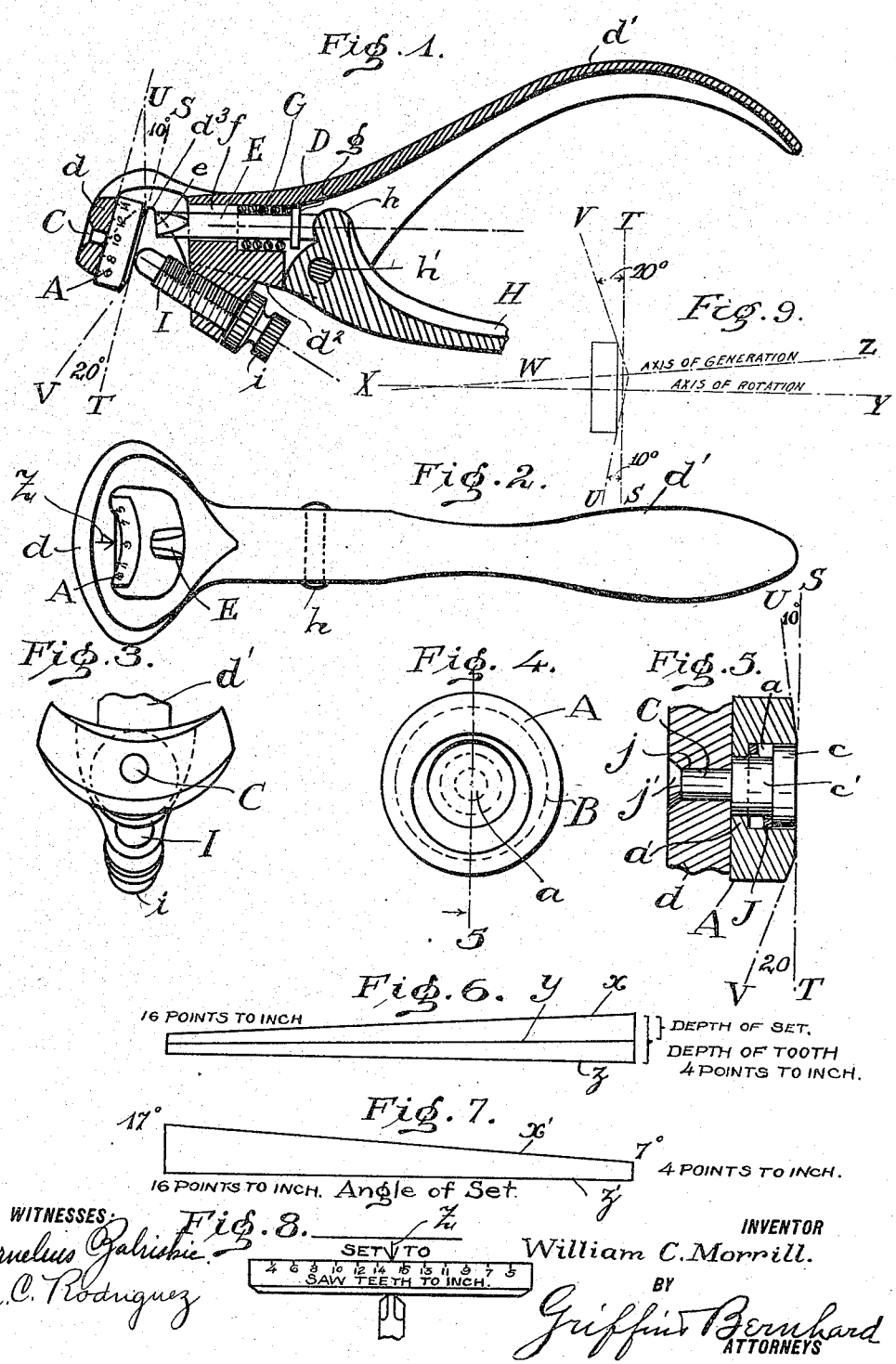

WILLIAM C. MORRILL, OF NEW YORK, N. Y.

SAW-SET.

1,176,773. Specification of Letters Patent. Patented Mar. 28, 1916.

Application filed September 25, 1912. Serial No. 722,188.

*To all whom it may concern:*

Be it known that I, WILLIAM C. MORRILL, a citizen of the United States, residing in the city of New York, borough of Manhattan, county and State of New York, have invented a certain new and useful Saw-Set, of which the following is a specification.

This invention is a saw set, and the object of the invention is to enable the users of saws, even though unskilled in saw setting, to accurately and expeditiously set the teeth.

It is well recognized that it is desirable that the depth of set be about half the depth of the tooth, and that the angle of the set should be varied according to the hardness of the material operated upon. Moreover, the less the number of teeth, the less the angle of set; *e. g.* in a saw having four points to the inch the set is at an angle of about 7°, whereas in a saw having twelve points to the inch the set is about 15°, the depths of set in the examples given being one-eighth ($\frac{1}{8}$) of an inch and one thirty-second ($\frac{1}{32}$) of an inch, respectively.

Heretofore no saw setting device has existed which could by a single adjustment of the anvil block be so positioned as to enable one to determine both the depth and angle of set.

The present invention enables this result to be accomplished in a simple, expeditious and accurate manner, and, accordingly, enables even an unskilled operator to properly set saws.

With the object specified in view, the salient feature of the invention consists in so constructing the face of the anvil block that it is by a single adjustment adapted to produce a predetermined depth and angle of set, in combination with a suitable scale to indicate the desired operative position of the anvil block.

In the accompanying drawings, I have illustrated one practical embodiment of the invention, but the construction shown therein is to be understood as illustrative, only, and not as defining the limits of the invention.

Figure 1 is a vertical section, partly in elevation, of a saw set embodying the invention. Fig. 2 is a plan view thereof. Fig. 3 is an end elevation. Fig. 4 is an enlarged detail view of the rotatable anvil disconnected from the instrument. Fig. 5 is a vertical section through the anvil and a part of the head on one member of the instrument, said view illustrating means for rotatably mounting the anvil in an operative position upon the head. Fig. 6 is a diagrammatic view illustrating a development of the depth of tooth and the depth of set for saws which vary from four to sixteen points to the inch. Fig. 7 is a diagrammatic view illustrating a development of the angle of the set of saws varying in number from four to sixteen points to the inch. Fig. 8 is a diagrammatic view illustrating a development of the saw point scale on the perimeter of the rotatable anvil. Fig. 9 is a detail view, mainly diagrammatic, of the rotatable anvil, the surface forming the saw tooth seat of which anvil is generated on an axis inclined or at an angle to the axis of rotation of the anvil, said axis of generation being eccentric to the circumference of the anvil.

Before proceeding to a detailed description of the saw set shown in the drawings, it is desired to briefly recite the practical conditions of use of instruments of this character in order that the merit and novelty of the new set may be fully appreciated.

The teeth of all hand saws are practically alike in shape, and as the angles are the same, the depth and width will vary in direct proportion to the number of teeth to the inch. It should be borne in mind that in the saw trade, saws are classified according to the number of saw points to the inch, and further that there is always one more saw point than teeth to the inch. Measurements by leading saw manufacturers have established the following as standard proportions:—In a four point (3 tooth) saw, the depth of the tooth should be one quarter inch ($\frac{1}{4}''$), depth of set one-eighth inch ($\frac{1}{8}''$), the distance set over .015", and the angle of set 7°; in a twelve point (11 tooth) saw, the depth of tooth should be one-sixteenth inch ($\frac{1}{16}''$), depth of set one thirty-second inch ($\frac{1}{32}''$), distance set over .01" and the angle of set 15°, and in other saws the same relative proportions should prevail.

The depth of the teeth for saws whose teeth vary from four points to sixteen points per inch are represented by the developed diagrammatic view Fig. 6, wherein the lines x y are at different angles to the base line z for the purpose of illustrating that the teeth whose numbers vary from four points to sixteen points to the inch decrease in depth from the lower number to the larger number, whereas the depth of set for such different teeth varied in like proportion, it always being remembered that the depth of set is about one-half the depth of the tooth. The variation in the angle of set is graphically shown in Fig. 7 wherein the top line x' is at an angle to the base line z' to show that the angles for teeth whose number varies from four to sixteen points should vary from 7° to 17°. Accordingly, any instrument to successfully and accurately set the teeth must be capable of fulfilling the two conditions as to, first, the depth of set, and, second, the angle of set, for all saws whose points vary in number to the inch.

Prior saw sets have embodied rotary anvils for use in connection with plungers to set the teeth of saw blades, but all such prior constructions have been so seriously defective that unskilled operators have not been able to accurately set the teeth without danger of breaking out the teeth or giving too great an angle of set. One of such prior devices embodied a rotary anvil, the circular working face of which was in eccentric relation to the center of rotation and which working face was beveled at a constant angle of about 15°, said bevel made varying in width correspondingly to the proper depth of set. Said anvil was so maintained that its axis of rotation was parallel to the axis of movement of the plunger, and the working face of said plunger was beveled at an angle of about 20°, so that the end of the plunger, when the latter was pressed forward, struck the beveled surface of the anvil at an angle of about 5°. The construction described, and the mechanical equivalent of the aforesaid eccentrically beveled and concentrically mounted anvil, i. e., an eccentrically mounted anvil with a concentrically curved working surface, were not successful devices for the reason that the end of the plunger easily broke off and rendered the devices inoperative and, also, in many cases, slipped off or mutilated the saw tooth, owing to the fact, among other things, that the faces of the plunger and the anvil were not properly positioned. Accordingly, subsequent development consisted in a change of the plunger whereby the angle of its operative end was reduced from about 20° to about 5° and the position of the anvil was also changed; but in view of the fact that the angle of set changes in saws the number of teeth in which varies, such changed instrument last referred to was not an operative or useful device for the reason that its use resulted in giving a large tooth too much angle of set and a small tooth not enough angle of set.

To overcome the foregoing and other difficulties inherent in prior saw sets, and to place in the hands of an unskilled operator an instrument by the use of which perfect results can be secured, without danger of breaking out the teeth or giving too great an angle of set to the tooth, I have produced the instrument of the present application, the anvil of which embodies a working face which is mathematically developed to automatically secure the proper angle and depth of set when said anvil is mounted in a novel relation to a plunger the working end of which coöperates with such working face of the anvil. The anvil A is shown as a member or block, circular in form, and pierced centrally at a, in order that it may be mounted for rotation on an axis concentric with the perimeter of said block or member. Said anvil is provided with a circular working face B, the same being eccentric to the axis of rotation of said anvil. Although the working faces of prior anvils have been beveled at different widths, in order that said anvil may be shifted to different operative positions, no prior construction, to my knowledge, has embodied an anvil characterized by a beveled working surface wherein the angle of such surface purposely varied according to the width, whereby the anvil of itself was made to accurately conform not only to the depth of set but also to the angle of set of the particular tooth operated upon. The angle of inclination of said eccentric face B varies at different points, as shown by the dotted lines in Fig. 5, wherein S T denotes the plane of the front exposed face of the anvil, and the lines U S and V T represent two of the angles of the beveled working face at diametrically opposite sides of the anvil, the former (U S) showing, clearly, that the angle at one part of such face is 10°, whereas the latter (V T) illustrates the angle as 20°, the remainder of such surface being beveled at different inclinations.

A salient feature of the working face is that the operative width thereof varies in harmony with the angle of inclination; thus in the case of a four point saw wherein the angle of set should not exceed 7°, the width of the face at that particular point does not exceed one-eighth of an inch ($\frac{1}{8}''$) in order to fulfil the two practical conditions of giving the proper depth of set as well as angle of set, it being recalled that the depth of set should not exceed more than one-half the depth of the tooth. Again, at another point in the working face B, adapted for setting a twelve point saw, the angle of inclination is 17° and the width of the face at that particular point should not exceed $\frac{1}{32}''$, and so on throughout the entire area of the circular working surface B, the width of which changes in accord with the variations in the angles of inclination. The anvil is mounted for rotation on a pin C which is supported in a head $d$ of frame D so that the axis of the pin is at an angle of about 15° to the axis of plunger E, said plunger having an operating end $e$.

The surface of the anvil against which the teeth are set constitutes a saw tooth seat, and this surface is generated by cutting the anvil on an axis positioned at an angle to the axis of rotation of said anvil. The aforesaid axis of generation of said saw tooth seat is eccentric to the perimeter or circumference of the anvil, and, furthermore, said axis of generation is inclined or at an angle to the axis of rotation of said anvil, as a result of which the metal on the front surface of the anvil is cut or otherwise formed so as to produce the saw tooth seat which varies in width as described and the angle of inclination of which seat varies at different points in the circle of said saw tooth seat.

Proceeding now to a detailed explanation of the specific form of instrument shown in the drawings, frame D is provided with a handle $d'$ and with a solid body portion $d^2$, one end of the frame being extended to produce a head $d$. Said head is spaced with respect to the body portion $d^2$ for the purpose of receiving the rotatable anvil A and to provide a gap or space between the working face of the anvil and the operative end of the plunger, into which space a saw blade is adapted to be inserted in a manner for the ends of the teeth to contact with the edge $d^3$ of that part of the frame which connects the handle member $d'$ with the head $d$.

Plunger E is free to slide within a chamber $f$ provided in the body portion $d^2$ of the frame, said plunger being provided intermediate its ends with a collar $g$ against which is seated one end of a coiled spring G, the latter being housed within the frame so as to be seated at one end against a shoulder which is provided within a recessed part $f$ of the frame body $d^2$. The rear end of plunger E is pressed by the spring normally into contact with a cam lug $h$ which is provided on a movable handle H, the latter being fulcrumed in a recessed part of the body member $d^2$ by pin $h'$. The pressure of the spring against shoulder $g$ of the plunger normally retains said plunger in contact with the cam $h$, and thus the spring acts upon the pivoted handle H to separate said handle with respect to the handle $d'$ of frame D, said spring acting, also, to withdraw the operative end $e$ of the plunger from contact with the working face of rotatable anvil A.

In the lower part of body member $d^2$ is provided a female threaded opening into which is screwed a gage screw I. Said gage screw is provided at one end with a milled head $i$, and said screw is positioned at an angle to the axial line of the plunger and also at an angle to the axis of rotation of anvil A. The gage screw is movable by hand so as to advance or retract its smooth end relative to the working face of the rotatable anvil, whereby the gage screw is adapted to take the back thrust of the saw blade during the operation of setting the teeth thereon.

For the purpose of retaining the rotatable anvil in any one of the several positions to which it may be turned, I have provided means for pressing the rear surface of the anvil into close frictional contact with the inner surface of head $d$ on the frame. The rotatable anvil is provided with a chamber or aperture $a$, one end of which opens through the front face of the anvil, whereas the rear part of the aperture is reduced in diameter so as to produce a shoulder $a'$, see Fig. 5. The supporting pin or arbor C for the anvil is provided at its front portion with a head $c$, the diameter of which corresponds to the internal diameter of chamber $a$ at that part thereof which opens through the working face of the anvil. In rear of this head $c$ the pin or arbor is reduced so as to form a shoulder $c'$, the external diameter of which is equal substantially to the internal diameter of the aperture at the shouldered part $a'$ of the anvil; and, furthermore, this pin or arbor C is again reduced in diameter along that part thereof which finds a bearing in an aperture $j$ of head $d$. The pin or arbor C is inserted by passing its part of small diameter through the anvil and the aperture $j$ of the head $d$, the rear part of the pin or arbor being upset as at $j'$ so as to retain the pin from movement in one direction with respect to the head $d$.

A coiled friction spring J surrounds the part $c'$ of arbor C so that the friction spring bears at one end against the shoulder formed by the head $c$ of the arbor and at its other end against the shoulder $a'$ of the anvil. The friction spring thus coöperates with the anvil and the arbor for the purpose of exerting its tension upon the shouldered part $a'$ of the anvil, whereby the rear surface of the anvil is pressed into close frictional contact with the inner surface of the head $d$. The frictional contact between the anvil and the head, due to the pressure of the coiled spring, is sufficient to retain the anvil in the position into which it may be adjusted by hand, and thus, all locking devices are rendered unnecessary for retaining the anvil in either of its several working positions. The enlarged head $c$ of the pin is substantially flush with the inner surface of the anvil, and the spring is housed within the chamber of the anvil so as to be concealed from view, the net result of the construction being an exceedingly compact and efficient organization of parts for rotatably mounting and frictionally holding the anvil in operative position within the instrument.

The operation may be described as follows: Assuming that it is desired to set the teeth of a saw having four points to the inch, the operator turns anvil A until the numeral four is brought into alinement with the index point Z, thus positioning the anvil for the proper angle and width of that part of the working face B to come opposite to the end $e$ of plunger E. The saw is now inserted into the space between anvil A and the plunger and gage screw, the face of the saw being in contact with that surface of the anvil denoted by the line S T, and the extreme ends of the teeth resting in contact with the surface $d^3$ of the frame. Gage screw I is now moved into contact with the saw blade, and a point or tooth lies between the end of the plunger and the operative part of the working face B on the anvil. The operator now presses handle H toward the handle $d'$ and moves plunger E against the tension of spring G so that the end of the plunger operates against the tooth of the saw for the purpose of setting the tooth into an inclined position determined by the angle on a particular part of the working surface B on the anvil, said particular part of the working surface determining, also, the depth of set of the particular tooth, for the reason that the width of the anvil face at the particular angle is equal to about half the depth of the tooth. The saw is now shifted so as to bring the next alternate tooth into position, and the operations are repeated until the alternate teeth are set the length of the saw blade, after which the saw is reversed and the operations described are repeated upon the intermediate teeth, whereby all the teeth will be set to the desired angle and depth of set. When it is desired to set the teeth on another saw blade the points of which vary in number from the saw previous set, the anvil must be rotated to bring the proper number on the periphery of said anvil into register with the index mark Z, thus positioning the selected part of the working face B into operative relation to the end of the plunger, whereupon the saw is inserted and the operations heretofore described are repeated for the purpose of giving the proper angle and depth of set to the teeth according to the number of points to the inch.

Having thus fully described the invention, what I claim as new, and desire to secure by Letters Patent is:

1. In a saw set, an anvil comprising a member provided with a surface constituting a seat for a saw blade and with a second surface constituting a seat for saw teeth, said second surface varying in width according to the depth of set to be imparted to the saw teeth and said second surface being beveled at different angles of inclination to the plane of the saw blade seat surface, said bevels varying according to the angle of set to be imparted to the saw teeth, combined with a frame, means for rotatably mounting said anvil, a plunger positioned for coöperation with said second surface of the anvil, and means for operating said plunger.

2. In a saw set, a rotatable anvil provided with a circular working surface in eccentric relation to the axis of rotation of the anvil, said working surface having different parts of its face beveled at different angles of inclination corresponding to the angle of set for the teeth of different saws and such differently beveled parts of the surface being of different widths corresponding to the depth of set for the teeth of said different saws, in combination with a suitable frame, a plunger, means for rotatably supporting the anvil within the frame, and means for operating said plunger.

3. In a saw set, an anvil comprising a member provided with a surface constituting a seat for a saw blade and with a second surface eccentric to the axis of rotation of the anvil and constituting a seat for the saw teeth to be set, said second eccentric surface varying in width according to the depth of set of the different saw teeth to be operated upon and said second eccentric surface being beveled at different angles of inclination to the plane of the saw blade seat surface, the angles of inclination of the second surface varying proportionately to the different widths of said second surface according to the variations in the depth of set and the angle of set to be imparted to the saw teeth to be operated upon, combined with a frame, a plunger positioned for coöperation with the second eccentric surface of the anvil, means for mounting said anvil for rotation so as to present different parts of its second eccentric surface into the path of the plunger, and means for operating the plunger.

4. In a saw set, the combination with a frame, of an anvil provided with a central aperture and with a shoulder interiorly of said aperture, a headed pin fixed on the frame and rotatably supporting the anvil, and a spiral spring contacting with the head of the pin and the shoulder of the anvil, said spring retaining the anvil in close frictional contact with the frame for precluding free rotative movement of the anvil within the frame.

5. In a saw set, a rotatable anvil provided with a surface forming a saw tooth seat, the axis of generation of which surface is at an angle to the axis of rotation of said anvil.

6. In a saw set, a rotatable anvil provided with a surface forming a saw tooth seat, the axis of generation of which surface is at an angle to the axis of rotation of said anvil, said axis of generation being eccentric to the perimeter of said anvil.

In testimony whereof I have signed my name to this specification in the presence of two subscribing witnesses.

WILLIAM C. MORRILL.

Witnesses:
JULIAN A. HURDLE,
RALPH V. S. MORRILL.

Copies of this patent may be obtained for five cents each, by addressing the "Commissioner of Patents, Washington, D. C."